(12) United States Patent
Derbeko et al.

(10) Patent No.: US 9,026,741 B1
(45) Date of Patent: May 5, 2015

(54) SYSTEM AND METHOD FOR WARMING CACHE

(75) Inventors: Philip Derbeko, Modiin (IL); Arieh Don, Newton, MA (US); Alex Veprinsky, Brookline, MA (US); Marik Marshak, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 168 days.

(21) Appl. No.: 13/539,431

(22) Filed: Jun. 30, 2012

(51) Int. Cl.
*G06F 12/00* (2006.01)
*G06F 11/20* (2006.01)

(52) U.S. Cl.
CPC .................................. *G06F 11/2017* (2013.01)

(58) Field of Classification Search
None
See application file for complete search history.

(56) References Cited

U.S. PATENT DOCUMENTS

| | | | | |
|---|---|---|---|---|
| 5,860,104 A * | 1/1999 | Witt et al. | ...................... | 711/137 |
| 6,098,064 A * | 8/2000 | Pirolli et al. | .......................... | 1/1 |
| 7,676,635 B2 * | 3/2010 | Newport et al. | .............. | 711/137 |
| 7,805,632 B1 * | 9/2010 | Luke et al. | .................... | 714/6.12 |
| 7,934,054 B1 * | 4/2011 | Moll et al. | ..................... | 711/113 |
| 2002/0007404 A1 * | 1/2002 | Vange et al. | .................... | 709/217 |
| 2004/0073707 A1 * | 4/2004 | Dillon | ........................... | 709/245 |
| 2011/0022801 A1 * | 1/2011 | Flynn | ............................ | 711/120 |
| 2011/0219190 A1 * | 9/2011 | Ng et al. | ....................... | 711/122 |

OTHER PUBLICATIONS

Makatos,T., Klonatos, Y., Marazakis, M., Flouris, M., and Bilas, A., Using Transparent Compression to Improve SSD-based I/O Caches EuroSys'10, Apr. 13-16, 2010, Paris, France.*
EMC Corporation, Leveraging Fully Automated Storage Tiering (FAST) with Oracle Database Applications, Sep. 2010.*

* cited by examiner

*Primary Examiner* — Matthew Bradley
*Assistant Examiner* — Francisco Grullon
(74) *Attorney, Agent, or Firm* — Brian J. Colandreo; Mark H. Whittenberger; Holland & Knight LLP

(57) ABSTRACT

A method, computer program product, and computing system for receiving an indication of a cold cache event within a storage system. The storage system includes a multi-tiered data array including at least a faster data tier and a slower data tier. A data list that identifies at least a portion of the data included within the faster data tier of the multi-tiered data array is obtained from the multi-tiered data array. At least a portion of the data identified within the data list is requested from the multi-tiered data array, thus defining the requested data. The requested data is received from the multi-tiered data array.

18 Claims, 3 Drawing Sheets

SYSTEM AND METHOD FOR WARMING CACHE

TECHNICAL FIELD

This disclosure relates to storage devices and, more particularly, to multitier storage devices.

BACKGROUND

Storing and safeguarding electronic content is of paramount importance in modern business. Accordingly, various systems may be employed to protect such electronic content. Data storage system are often compartmentalized into different tiers having different levels of performance, wherein data that is accessed less often is placed into a slower performance tier, while data that is accessed more often is placed into a higher performance tier.

SUMMARY OF DISCLOSURE

In a first implementation, a computer-implemented method includes receiving an indication of a cold cache event within a storage system. The storage system includes a multi-tiered data array including at least a faster data tier and a slower data tier. A data list that identifies at least a portion of the data included within the faster data tier of the multi-tiered data array is obtained from the multi-tiered data array. At least a portion of the data identified within the data list is requested from the multi-tiered data array, thus defining the requested data. The requested data is received from the multi-tiered data array.

One or more of the following features may be included. The multi-tiered data array may include a faster data tier, a medium data tier, and a slower data tier. The faster data tier may include one or more flash storage devices, the medium data tier may include one or more fiber channel storage devices, and the slower data tier may include one or more SATA storage devices. The storage system may include a front end cache system. At least a portion of the front end cache system may be populated with at least a portion of the requested data. The front end cache system may be a flash-based front end cache system. The multi-tiered data array may include a back end cache system.

In another implementation, a computer program product residing on a computer readable medium having a plurality of instructions stored thereon which, when executed by a processor, cause the processor to perform operations including receiving an indication of a cold cache event within a storage system. The storage system includes a multi-tiered data array including at least a faster data tier and a slower data tier. A data list that identifies at least a portion of the data included within the faster data tier of the multi-tiered data array is obtained from the multi-tiered data array. At least a portion of the data identified within the data list is requested from the multi-tiered data array, thus defining the requested data. The requested data is received from the multi-tiered data array.

One or more of the following features may be included. The multi-tiered data array may include a faster data tier, a medium data tier, and a slower data tier. The faster data tier may include one or more flash storage devices, the medium data tier may include one or more fiber channel storage devices, and the slower data tier may include one or more SATA storage devices. The storage system may include a front end cache system. At least a portion of the front end cache system may be populated with at least a portion of the requested data. The front end cache system may be a flash-based front end cache system. The multi-tiered data array may include a back end cache system.

In another implementation, a computing system including at least one processor and at least one memory architecture coupled with the at least one processor, wherein the computing system is configured to perform operations including receiving an indication of a cold cache event within a storage system. The storage system includes a multi-tiered data array including at least a faster data tier and a slower data tier. A data list that identifies at least a portion of the data included within the faster data tier of the multi-tiered data array is obtained from the multi-tiered data array. At least a portion of the data identified within the data list is requested from the multi-tiered data array, thus defining the requested data. The requested data is received from the multi-tiered data array.

One or more of the following features may be included. The multi-tiered data array may include a faster data tier, a medium data tier, and a slower data tier. The faster data tier may include one or more flash storage devices, the medium data tier may include one or more fiber channel storage devices, and the slower data tier may include one or more SATA storage devices. The storage system may include a front end cache system. At least a portion of the front end cache system may be populated with at least a portion of the requested data. The front end cache system may be a flash-based front end cache system. The multi-tiered data array may include a back end cache system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
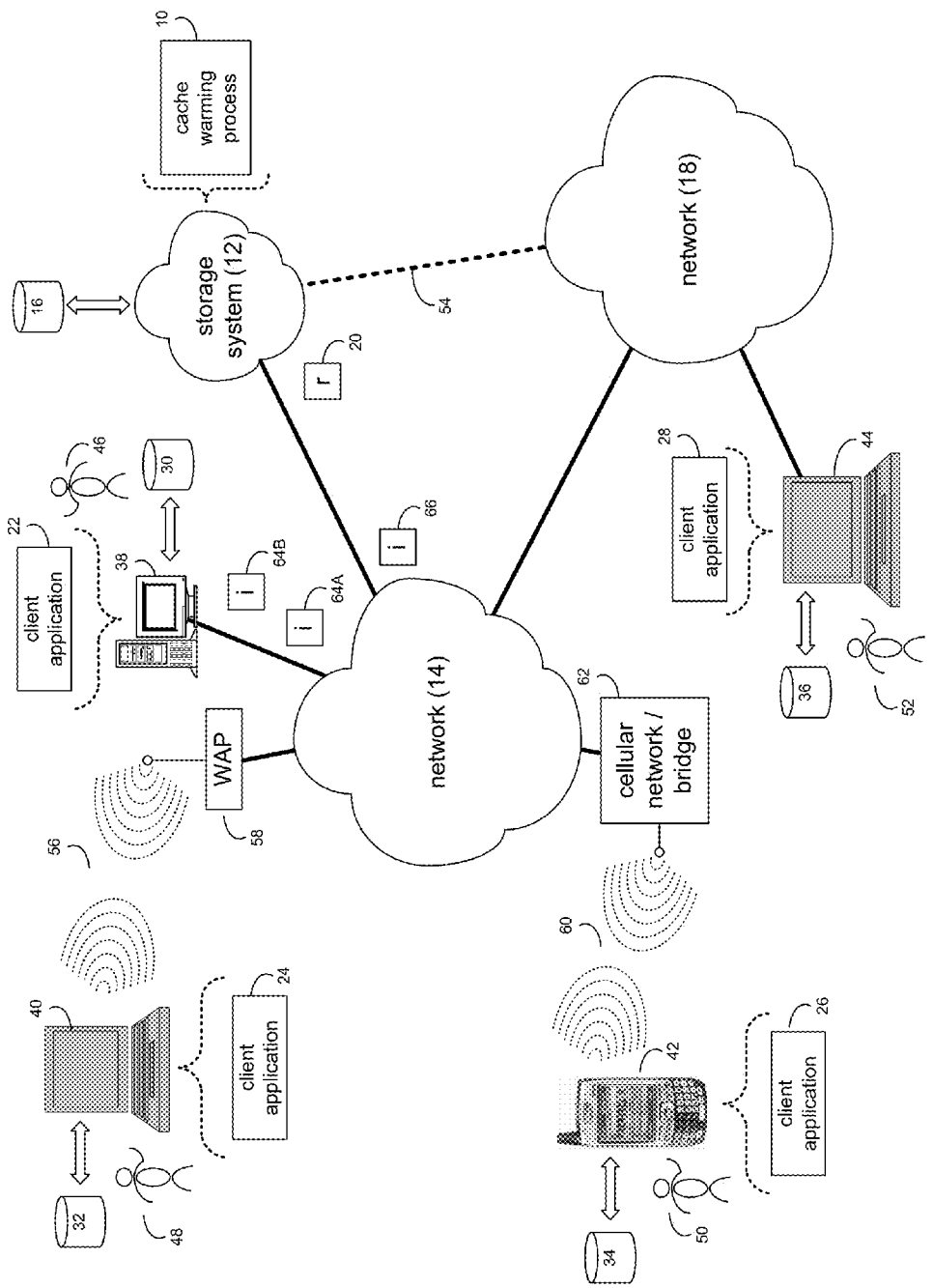
FIG. 1 is a diagrammatic view of a storage system and a cache warming process coupled to a distributed computing network.

System Overview:

Referring to FIG. 1, there is shown cache warming process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of cache warming process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage system 12. Examples of data request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Client electronic devices 38, 40, 42, 44 may each execute an operating system, examples of which may include but are not limited to Microsoft Windows™, Microsoft Windows CE™, Redhat Linux™, or a custom operating system.

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of rotating, electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
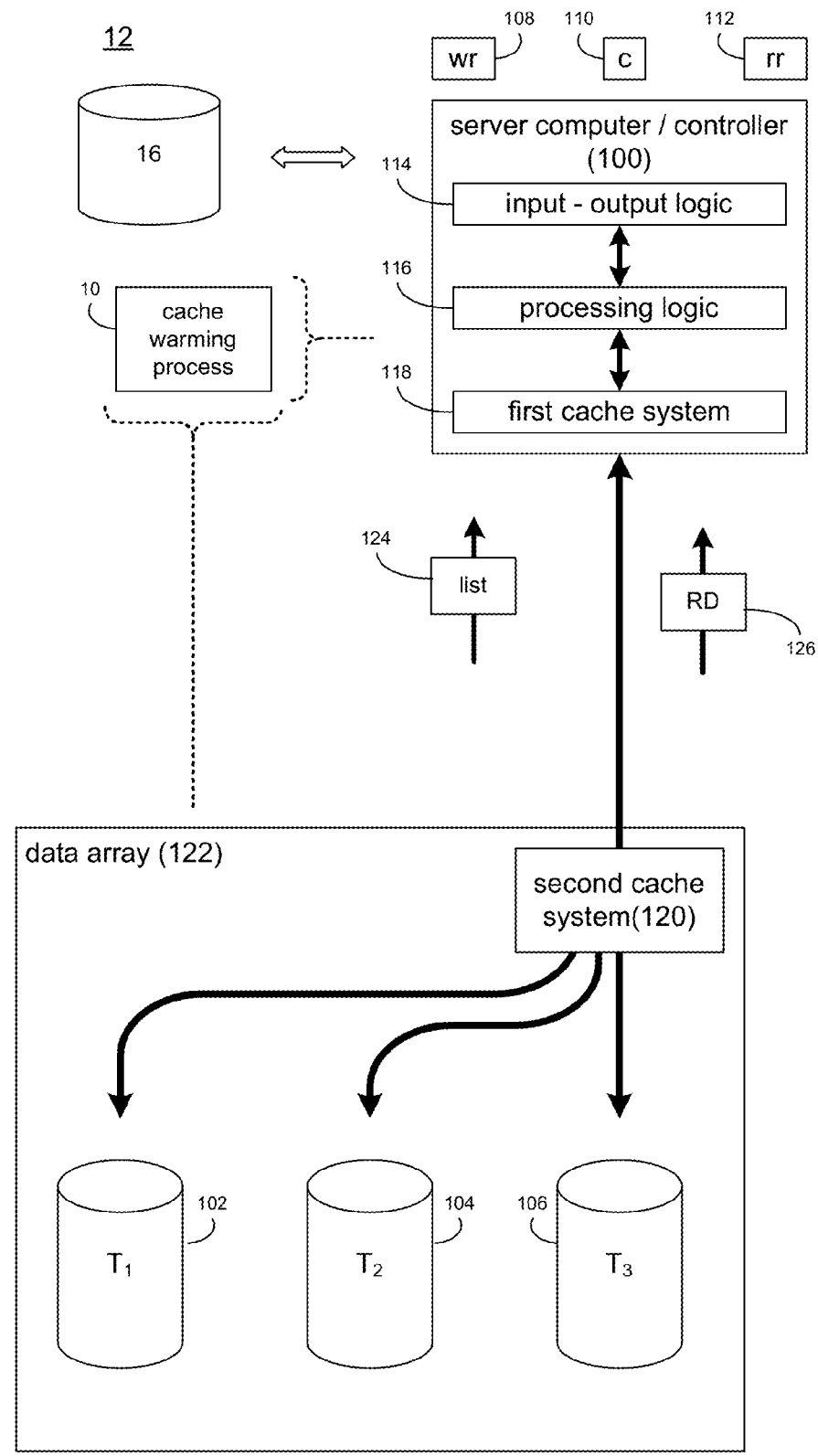
FIG. 2 is a diagrammatic view of the storage system of FIG. 1.

Referring also to FIG. 2, storage system 12 may include a server computer/controller (e.g. server computer/controller 100), and a plurality of data tiers $T_{1-n}$ (e.g. data tiers 102, 104, 106). Data tiers 102, 104, 106 may be configured to provide various levels of performance. For example. one or more of data tiers 102, 104, 106 may be configured to be a lower performance data tier and one or more of data tiers 102, 104, 106 may be configured to be a higher performance data tier.

For example, data tier 102 may be configured as a higher performance data tier and may include one or more flash storage devices. Data tier 104 may be configured as a medium performance data tier and may include one or more fiber channel storage devices. And data tier 104 may be configured as a lower performance data tier and may include one or more lower performance storage devices (e.g., SATA drives, SCSI drives, SAS drives, IDE drives, and EIDE drives).

One or more of data tiers 102, 104, 106 may be configured to provide various levels of performance and/or high availability. For example, one or more of data tiers 102, 104, 106 may be configured as a RAID 0 array, in which data is striped across multiple drives. By striping data across multiple drives, improved performance may be realized. However, RAID 0 arrays do not provide a level of high availability. Accordingly, one or more of data tiers 102, 104, 106 may be configured as a RAID 1 array, in which data is mirrored between multiple drives. By mirroring data between multiple drives, a level of high availability is achieved as multiple copies of the data are stored within storage system 12.

While data tiers 102, 104, 106 are discussed above as possibly being configured in a RAID 0 or RAID 1 array, this is for illustrative purposes only and is not intended to be a limitation of this disclosure, as other configurations are possible. For example, data tiers 102, 104, 106 may be configured in a non-RAID fashion or as a RAID 3, RAID 4, RAID 5 or RAID 6 array.

While in this particular example, storage system 12 is shown to include three data tiers (e.g. data tiers 102, 104, 106), this is for illustrative purposes only and is not intended to be a limitation of this disclosure. Specifically, the actual number of data tiers may be increased or decreased depending upon system needs.

As discussed above, data tiers 102, 104, 106 may include one or more flash storage devices, fiber channel storage devices, and lower performance storage devices (e.g., SATA drives, SCSI drives, SAS drives, IDE drives, and EIDE drives).

Storage system 12 may execute all or a portion of cache warming process 10. The instruction sets and subroutines of cache warming process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various data requests (e.g. data request 20) may be generated. For example, these data requests may be sent from client applications 22, 24, 26, 28 to storage system 12. Additionally/alternatively and when server computer/controller 100 is configured as an application server, these data requests may be internally generated within server computer/controller 100. Examples of data request 20 may include but are not limited to data write request 108 (i.e. a request that content 110 be written to storage system 12) and data read request 112 (i.e. a request that content 110 be read from storage system 12).

Server computer/controller 100 may include input-output logic 114 (e.g., a network interface card or a Host Bus Adaptor (HBA)), processing logic 116, and first cache system 118. Examples of first cache system 118 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 110 to be written to storage system 12 may be received by input-output logic 114 (e.g. from network 14 and/or network 18) and processed by processing logic 116. Additionally/alternatively and when server computer/controller 100 is configured as an application server, content 110 to be written to storage system 12 may be internally generated by server computer/controller 100. As will be discussed below in greater detail, processing logic 116 may initially store content 110 within first cache system 118.

Depending on the manner in which first cache system 118 is configured, processing logic 116 may immediately write content 110 to second cache system 120/data tiers 102, 104, 106 (if first cache system 118 is configured as a write-through cache) or may subsequently write content 110 to second cache system 120/data tiers 102, 104, 106 (if first cache system 118 is configured as a write-back cache). Examples of second cache system 120 (i.e., a backend cache system) may include but are not limited to a volatile, solid-state, cache memory system (e.g., a dynamic RAM cache memory system) and/or a non-volatile, solid-state, cache memory system (e.g., a flash-based, cache memory system).

The combination of second cache system 120 and data tiers 102, 104, 106 may form data array 122, wherein first cache system 118 may be sized so that the number of times that data array 122 is accessed may be reduced. Accordingly, by sizing first cache system 118 so that first cache system 118 retains a quantity of data sufficient to satisfy a significant quantity of data requests (e.g., data request 20), the overall performance of storage system 12 may be enhanced.

Further, second cache system 120 within data array 122 may be sized so that the number of times that data tiers 102, 104, 106 are accessed may be reduced. Accordingly, by sizing second cache system 120 so that second cache system 120 retains a quantity of data sufficient to satisfy a significant quantity of data requests (e.g., data request 20), the overall performance of storage system 12 may be enhanced.

As discussed above, the instruction sets and subroutines of cache warming process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of cache warming process 10 may be executed by one or more processors (not shown) and one or more memory architectures (not shown) included within data array 122.

The Cache Warming Process:

As discussed above, data tiers 102, 104, 106 may be configured to provide various levels of performance, wherein one or more of data tiers 102, 104, 106 may be configured to be a lower performance data tier and one or more of data tiers 102, 104, 106 may be configured to be a higher performance data tier.

Accordingly, data tier 102 may be configured as a higher performance data tier and may include one or more flash storage devices. Data tier 104 may be configured as a medium performance data tier and may include one or more fiber channel storage devices. And data tier 106 may be configured as a lower performance data tier and may include one or more lower performance storage devices (e.g., SATA drives, SCSI drives, SAS drives, IDE drives, and EIDE drives).

Figure 3:
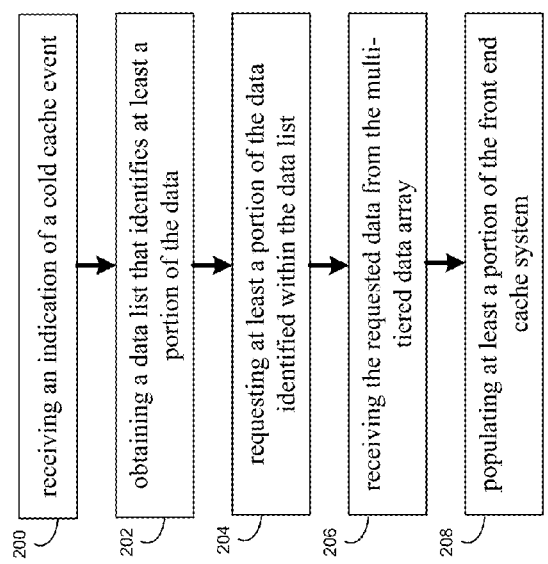
FIG. 3 is a flow chart of the cache warming process of FIG. 1.

Referring also to FIG. 3, assume for illustrative purposes that cache warming process 10 receives 200 an indication of a cold cache event within storage system 12. For example, storage system 12 may have been through a power failure event or a data corruption event. Unfortunately, in the event of a cold cache, it may take several hours (or longer) for storage system 12 to recover to optimal performance. As discussed above, storage system 12 may include a multi-tiered data array (e.g., data array 122) that includes at least a faster data tier (e.g., data tier 102) and a slower data tier (e.g., data tier 106).

Assume for the following example that multi-tiered data array 122 includes a faster data tier (e.g., data tier 102), a medium data tier (e.g., data tier 104), and a slower data tier (e.g., data tier 106), wherein data tier 102 includes one or more flash storage devices, data tier 104 includes one or more fiber channel storage devices, and data tier 106 includes one or more SATA storage devices.

Cache warming process 10 may obtain 202, from multi-tiered data array 122, data list 124 that may identify at least a portion of the data included within data tier 102 of multi-tiered data array 122. Specifically, hot data (i.e., data that is being used often) is placed within the faster data tier (e.g., data tier 102), wherein data that was hot prior to the above-referenced cold cache event is probably going to be hot after the cold cache event.

Upon obtaining 202 data list 124 from multi-tiered data array 122, cache warming process 10 may request 204, from multi-tiered data array 122, at least a portion of the data identified within data list 124, thus defining requested data 126. The quantity of data requested by cache warming process 10 may vary depending upon the capacity of first cache system 118 (i.e., a front end cache system). For example, if data tier 102 of multi-tiered data array 122 has one hundred gigabytes of data stored within it, and first cache system 118 has a total storage capacity of sixteen gigabytes, cache warming process 10 may only request from multi-tiered data array 122 the "hottest" sixteen gigabytes of data stored multi-tiered data array 122.

Cache warming process 10 may receive 206 requested data 126 from multi-tiered data array 122 and may use requested data 126 to populate 208 at least a portion of first cache system 118 with at least a portion of requested data 126. Accordingly, if the quantity of data available from data tier 102 of multi-tiered data array 122 is equal to or exceeds the total storage capacity of first cache system 118, cache warming process 10 may fully populate 208 first cache system 118. Conversely, if the quantity of data available from data tier 102 of multi-tiered data array 122 is less than the total storage capacity of first cache system 118, cache warming process 10 may only partially populate 208 first cache system 118.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving an indication of a cold cache event within a storage system, wherein the storage system includes a multi-tiered data array including at least a faster data tier and a slower data tier, wherein the cold cache event includes at least one of a power failure event and a data corruption event, wherein the storage system includes a front end cache system having a defined storage capacity;
obtaining, from the multi-tiered data array, a data list that identifies at least a portion of the data included within the faster data tier of the multi-tiered data array;
requesting, from the multi-tiered data array, at least a portion of the data identified within the data list, thus defining the requested data; and
receiving the requested data from the multi-tiered data array, including receiving an amount of most accessed data from the multi-tiered data array equivalent to the defined storage capacity of the front end cache system.

2. The computer-implemented method of claim 1 wherein the multi-tiered data array includes a faster data tier, a medium data tier, and a slower data tier.

3. The computer-implemented method of claim 2 wherein the faster data tier includes one or more flash storage devices, the medium data tier includes one or more fiber channel storage devices, and the slower data tier includes one or more SATA storage devices.

4. The computer-implemented method of claim 1 further comprising:
populating at least a portion of the front end cache system with at least a portion of the requested data.

5. The computer-implemented method of claim 1 wherein the front end cache system is a flash-based front end cache system.

6. The computer-implemented method of claim 1 wherein the storage system includes a data array including the multi-tiered data array and a back end cache system separate from the front end cache system.

7. A computer program product residing on a non-transitory computer readable medium having a plurality of instructions stored thereon which, when executed by a processor, cause the processor to perform operations comprising:
receiving an indication of a cold cache event within a storage system, wherein the storage system includes a multi-tiered data array including at least a faster data tier and a slower data tier, wherein the cold cache event includes at least one of a power failure event and a data corruption event, wherein the storage system includes a front end cache system having a defined storage capacity;
obtaining, from the multi-tiered data array, a data list that identifies at least a portion of the data included within the faster data tier of the multi-tiered data array;
requesting, from the multi-tiered data array, at least a portion of the data identified within the data list, thus defining the requested data; and
receiving the requested data from the multi-tiered data array, including receiving an amount of most accessed data from the multi-tiered data array equivalent to the defined storage capacity of the front end cache system.

8. The computer program product of claim 7 wherein the multi-tiered data array includes a faster data tier, a medium data tier, and a slower data tier.

9. The computer program product of claim 8 wherein the faster data tier includes one or more flash storage devices, the medium data tier includes one or more fiber channel storage devices, and the slower data tier includes one or more SATA storage devices.

10. The computer program product of claim 7 further comprising instructions for:
populating at least a portion of the front end cache system with at least a portion of the requested data.

11. The computer program product of claim 7 wherein the front end cache system is a flash-based front end cache system.

12. The computer program product of claim 7 wherein the storage system includes a data array including the multi-tiered data array and a back end cache system separate from the front end cache system.

13. A computing system including at least one processor and at least one memory architecture coupled with the at least one processor, wherein the computing system is configured to perform operations comprising:
receiving an indication of a cold cache event within a storage system, wherein the storage system includes a multi-tiered data array including at least a faster data tier and a slower data tier, wherein the cold cache event includes at least one of a power failure event and a data corruption event, wherein the storage system includes a front end cache system having a defined storage capacity;
obtaining, from the multi-tiered data array, a data list that identifies at least a portion of the data included within the faster data tier of the multi-tiered data array;
requesting, from the multi-tiered data array, at least a portion of the data identified within the data list, thus defining the requested data; and
receiving the requested data from the multi-tiered data array, including receiving an amount of most accessed data from the multi-tiered data array equivalent to the defined storage capacity of the front end cache system.

14. The computing system of claim 13 wherein the multi-tiered data array includes a faster data tier, a medium data tier, and a slower data tier.

15. The computing system of claim 14 wherein the faster data tier includes one or more flash storage devices, the medium data tier includes one or more fiber channel storage devices, and the slower data tier includes one or more SATA storage devices.

16. The computing system of claim 13 further configured to perform operations comprising:
populating at least a portion of the front end cache system with at least a portion of the requested data.

17. The computing system of claim 13 wherein the front end cache system is a flash-based front end cache system.

18. The computing system of claim 13 wherein the storage system includes a data array including the multi-tiered data array and a back end cache system separate from the front end cache system.

* * * * *